(12) United States Patent
Droz et al.

(10) Patent No.: US 7,908,379 B2
(45) Date of Patent: Mar. 15, 2011

(54) AUTOMATIC MOBILE DEVICE DETECTION

(75) Inventors: Patrick Droz, Rueschlikon (CH);
Andreas Kind, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 11/367,526

(22) Filed: Mar. 3, 2006

(65) Prior Publication Data

US 2006/0149844 A1    Jul. 6, 2006

(30) Foreign Application Priority Data

Sep. 5, 2003  (EP) .................................... 03405647
Aug. 20, 2004  (WO) .................. PCT/IB2004/002711

(51) Int. Cl.
  *G06F 15/177*    (2006.01)
  *G06F 15/16*    (2006.01)
  *H04W 4/00*    (2009.01)
  *H04W 36/00*    (2009.01)
  *H04W 72/00*    (2009.01)

(52) U.S. Cl. ......... 709/227; 709/220; 709/221; 709/228; 709/229; 455/435; 455/436; 455/440; 455/452.1

(58) Field of Classification Search .................. 709/220, 709/227; 455/435, 436, 440, 452.1
See application file for complete search history.

(56) References Cited

U.S. PATENT DOCUMENTS

| | | | | |
|---|---|---|---|---|
| 6,172,986 B1* | 1/2001 | Watanuki et al. | ............. | 370/466 |
| 6,510,153 B1* | 1/2003 | Inoue et al. | .................... | 370/354 |
| 6,510,318 B1 | 1/2003 | Minagawa | | |
| 6,675,208 B1* | 1/2004 | Rai et al. | ........................ | 709/224 |
| 2002/0131402 A1* | 9/2002 | Lee et al. | ....................... | 370/352 |
| 2003/0017843 A1 | 1/2003 | Noblins | | |
| 2004/0083293 A1* | 4/2004 | Chen et al. | ..................... | 709/227 |
| 2004/0123153 A1* | 6/2004 | Wright et al. | ................. | 713/201 |
| 2005/0013280 A1* | 1/2005 | Buddhikot et al. | ........... | 370/349 |

FOREIGN PATENT DOCUMENTS

| | | |
|---|---|---|
| JP | PUPA11262048 | 9/1999 |
| JP | PUPA2000224645 | 11/2000 |
| JP | PUPA2002204246 | 7/2002 |
| JP | PUPA2002223218 | 8/2002 |

* cited by examiner

*Primary Examiner* — Hassan Phillips
*Assistant Examiner* — Lin Liu
(74) *Attorney, Agent, or Firm* — William Stock; Anne Vachon Dougherty

(57) ABSTRACT

A method and an apparatus for classifying a data network connectable computing device as a mobile computing device. Information related to the location of a registering device is determined. The determined location information is compared to a stored location information associated to this device. The device is detected as a mobile device when at least the stored location information is different to the determined location information. Neither the devices themselves nor any access mechanism to the data network have to be changed.

20 Claims, 2 Drawing Sheets

AUTOMATIC MOBILE DEVICE DETECTION

FIELD OF THE INVENTION

The invention relates to a method, an apparatus, and a computer program element for detecting a data network connectable mobile computing device.

BACKGROUND OF THE INVENTION

Keeping an accurate inventory of all the networking devices a company or any other organization has is a difficult task. In the presence of mobile computing devices, such as personal digital assistants (PDAs) or laptops, the task becomes even more difficult.

A possible solution for identifying mobile computing devices is to install a service program on the device itself which can send out information about the device and its properties to a central server. However, such service programs can in principle be switched off by the user. Additional installation and maintenance effort is involved.

As an alternative, the user log on process could be run via a central registration mechanism. However, installation and maintenance efforts are also high for such a registration mechanism, as well as all devices would have to be told to register with this particular machine.

"VitalQIP™ Registration Manager 2.1", retrieved and accessed on the Internet using the address for the page found at www.lucent.com/livelink/090094038003cebb_Brochure-_datasheet.pdf as of Aug. 5, 2003, introduces an address management tool which enables an association between a device user and the MAC (Machine Access Code) address. The system automatically captures the device's MAC address each time a user requests an address via DHCP (Dynamic Host Configuration Protocol) in order to provide an approved address. In a first step, as the user registers the associated MAC address is automatically captured and stored in the user's profile.

U.S. Pat. No. 5,884,024 shows a DHCP server comprising several security features. "Amulet: Approximate Mobile User Location Tracking System", Blake M. Harris, retrieved and accessed on the Internet using the address for the page found at darkfate.com/bmh/other/pubs/Amulet.pdf, as of Aug. 5, 2003, introduces a mechanism to track wireless LAN users. The real time signal strength from all available access points is mapped against a data base containing signal strength distributions for different geographical areas.

"The Business Case for Directory-Centric IP Resource Management", Irwin Lazar, retrieved and accessed on the Internet using the address www2.dc.net/ilazar/ldap.pdf, as of Aug. 5, 2003, discusses the deployment of directories to help manage network resources such as user information and address assignments.

Accordingly, it is desired to provide a method, an apparatus, and a computer program element for detecting a mobile property of a computing device connectable to a data network without the necessity to change existing network access mechanisms and without the necessity to amend devices for delivering the desired information.

SUMMARY OF THE INVENTION

According to one aspect of the present invention, there is provided a method for detecting a data network connectable mobile computing device. Information related to the location of a connect requesting device is determined. This determined location information is compared to a stored location information associated to this device. Finally, the device is detected as a mobile device when at least the stored location information is different to the determined location information.

This method can be run automatically at some place or on some node in the data network. The method can typically be operated as part of or in combination with a network management system or a component of a network management system. Emphasis is on detecting devices of mobile character respectively exploring which device connected to the data network is a mobile one. Thus, the mobile character of a device is explored. Basic idea is to maintain a record mapping location information to device identifiers. Once a device shows up at a different location than before, the device is likely to be a mobile device, and accordingly the device might be registered as a mobile device, e.g. in a table record.

This method allows identification online of the inventory of an organization or a company. However, not only an inventory as such can be detected, but the detected inventory can be classified into mobile and non-mobile computing devices, wherein mobile computing devices are typical portable computing devices such as laptops, personal digital assistants, smart phones, digital cameras, wearable computers and network embedded devices. These devices have to be equipped with a wired or a wireless interface to the data network to be registrable for the mobile device detection engine, as an appearance of the device in the network draws sooner or later the attention of the classification engine to the device. In the following, the term mobile device detection engine is used as a synonym for the apparatus according to one aspect of the invention performing the method as described herein.

The mobile device detection engine can, for example, monitor at least segments of the network for registration requests of devices. Triggered by such a registration request, the detection/classification process is initiated and can result in a classification of the device as a mobile device, or as another device, or a device that did not appear in the network during a monitoring session so far. However, the scope of the protection is not limited to determine location information of devices during their registration session: The mobile device detection method might also look for devices already being connected and having had a connect requesting session in the past but still being logged to the network. As in several embodiments of the present invention, the primary point of contact for the device, which primary point of contact might be a router, a DHCP server, or a Wireless Local Area Network WLAN access point, can deliver some regional information for the area in which the device is located. This information might be implicit information such as that a WLAN access point covers a limited geographical area, a DHCP server is responsible for connect requesting devices in a specific geographical domain or a specific administrative domain which limited administrative domain in turn results in most of the times in a limited geographic domain. This primary point of contact is typically accessed first by a device asking to register to the data network. As long as such devices are registered somewhere, for example at the primary point of contact while being registered to the data network, and provided that the location related information is also accessible while being registered, meaning that a record is kept at each DHCP server or centrally to provide information of which device is currently registered with the DHCP server or with each of the DHCP servers of an administrative domain which record lists all the registered devices and assigned DHCP servers, the method as proposed can be executed during the registration period but also later on by accessing the data which can deliver location related information. However, if information, such as which device accessed the data network and from where the device accessed the data network, is still accessible even after a device deregistered from the data network (i.e., by keeping a log file of all registered devices during a session), the method can also be executed independent from any current registration processes by accessing log files at primary points of contact or centrally maintained log files. Then, log files can be accessed via the data network at times of low network traffic, in particular when different resources like DHCP servers have to be accessed for retrieving location related information. The device has to at least attempt or have attempted to register to the data network, as the device must be visible to at least some data network entity, which in turn might be accessed for information derivation purposes by the mobile device detection engine.

The data network itself is preferably an Internet Protocol (IP) based network, such as e.g. the Internet, or an Intranet, or any subdivision of. The data network might also be any other local or wide area network for transmitting data.

The information whether a device registered to the network can be considered as a mobile device can also be used for other purposes such as usage reporting, network profiling, accounting, charging or billing. In addition, mobile devices can also be automatically kept track of.

The steps are performed automatically by support of computing means. Thus, the device detection and classification can be performed automatically. Neither the registered devices nor any applied access mechanisms have to be changed for performing the mobile device detection as proposed.

It is necessary to determine information related to the location of a connect requesting device. This information can be gathered during the connect request procedure or even on when the device is or already was connected to the data network, as mentioned before. There are many different ways to determine location related information. Note, that the term location is not necessarily defined in absolute geographic terms. And even if the term location is defined by geographic boundaries in some embodiments, these boundaries are not necessarily to be known by the application itself. Moreover, in some embodiments, location information can represent any area provided that other areas are specified by other location information. In this respect, the location is primarily defined in relation to other locations.

In one preferred embodiment, a device registers to the data network by addressing a request to a DHCP server which in more general words acts as an Internet Protocol (IP) address allocation server. Such a device typically does not have a fixed IP address assigned, but sends a request to the DHCP server every time it wants to register to the data network. Typically, a DHCP server is responsible for providing an IP address to devices located in a certain building, a certain area, a certain organization, a more rough location, or a precise location, etc. Then, the fact that this DHCP server is addressed means that the device is located within the responsibility of this particular DHCP server. In turn, the DHCP server itself represents a location information that is assigned to the device being registered. In case later on the same device should attempt to connect to the data network via another DHCP server, it can be assumed that the device is now located elsewhere, at least remote from the area the first DHCP server is responsible for. In a preferred embodiment, the DHCP server identity can e.g. act as information being relevant to the location of a device requesting an IP address from this DHCP server.

Preferably, if a device requests an IP address from a different access point, the device can be regarded as mobile. Mobile devices can therefore automatically be detected by e.g. looking at the IP address assignment profile via DHCP. However, the mobile device detection engine then needs access to different DHCP servers, in case a single DHCP server represents one access point and thus one specific location.

The same concept can also be applied to routers or other network devices in general which are responsible for handling data packets or take over other network services. As a router is typically responsible as a first point of contact for routing data packets generated by devices that are close to the router, a certain router can also represent a location information that is assigned to the connect requesting device.

The mobile device detection engine preferably accesses one or more sources of location information such as DHCP servers, routers, DNS severs or other network entities. In particular, at such network devices tables comprising data of presently connected devices or log files comprising data of previously connected devices are accessed.

In case a device makes use of a wireless local area network for accessing the data network, location information can also be derived from analyzing the device's communication on a wireless LAN. Any method suitable can be applied. The coverage of a defined WLAN access point may be of sufficient resolution such that the access point may represent the location related information needed. In a more granular approach, the signal strength at the device's location may be taken as location information. "Amulet: Approximate Mobile User Location Tracking System", Blake M. Harris, already cited above, introduces the corresponding principle which is incorporated herein by reference.

In another embodiment, the device itself might be capable of determining its own location and provide the classification entity with the relevant location data periodically or upon request. Making use of the global positioning system (GPS) might support location detection efforts for the device.

In another embodiment, a registration relay agent forwards the device registration request to a dedicated DHCP server. The relay agent may use the agent circuit ID sub-option (see "DHCP Relay Agent Information Option", RFC 3046, IETF, January 2001) to communicate this information.

According to another embodiment, geographic location information in the form of a location object including latitude, longitude and altitude is provided by the client itself to a DHCP server or a DHCP relay agent.

It is emphasized, that one or more of the proposed location determination schemes can be applied in parallel, access to the relevant information sources provided.

In order to compare a previous location of a device to an actual one, it is preferred to use identifiers in order to identify the devices. According to "Dynamic Host Configuration Protocol", RFC 2131, IETF, March 1997, a DHCP server needs to use some unique identifier to associate a client with its registration. A preferred identifier can be a device's machine access code (MAC) address. Another possibility is the manufacturer's serial number or a DNS name. As the MAC address of a connect requesting device is visible to the first point of contact, and as many network entities such as DHCP servers or routers keep records or log files of MAC addresses, it is preferred to identify a device by way of its MAC address and to access the MAC address lists in the respective network entities. Once a device is identified e.g. by its MAC address, a stored table can be searched for this device. This table comprises location information that is associated to device identifiers. This table is an element of the mobile device detection engine that provides the information at which location a device was previously detected.

In case a specific device is not registered yet in the look-up table, the look-up table is preferably amended by inserting the device identifier of the new device together with the determined location information in order to reflect the current state of device locations. However, when the device identifier is already stored in the look-up table which means that the corresponding device registered with the data network at least once in previous times, the associated location information as stored in the look-up table is compared to the location information that as actually determined. In case these location information match, the device has probably accessed the data network for several times from the same location. The device might then probably classified as a non-mobile device such as a desktop computer, a tower computer or a server computer. However, this classification/registration is wrong when the device is a mobile device that does not change its position over a long period of time.

In case the determined location does not match the stored location, this is a strong indication that the device has mobile properties, (i.e. it is portable and made for mobile usage). However, from time to time also a non-mobile device might be relocated and appear as a mobile device dependent on the algorithm that determines the condition when a device is classified as a mobile device.

The final algorithm for detecting a mobile device as such can vary. It certainly will be based in one way or another on the fact that a determined location differs from a previous stored location. This is a criterion that at least has to be fulfilled for detecting a device as a mobile device. Other additional criteria might have to be fulfilled before a device will be registered as a mobile device. According to a preferred embodiment, a registration as a mobile device might be considered only when a different device locations can be detected for several times, even a number n of times within a specified time limit. Such mechanism ensures that a non-mobile device that is once relocated seldom, for example one time within a year, will not be regarded as a mobile device. Vice versa, such mechanism might prevent classification of a mobile device as a non mobile device when the device is primarily operated from one location and transferred only on, for example, a monthly basis.

When the determined and the stored location information differ, the stored location information is preferably replaced by the actual, determined location information. Or, in an alternative embodiment, the actual location information might be stored in addition to the previous location information. This is beneficial for algorithms which execute the classification based on information of the past.

According to other aspects of the present invention, there is provided an apparatus for detecting a mobile computing device connectable to a data network, comprising a control unit for executing a method as described in any one of the method related claims, and there is provided a computer program element comprising computer program code for executing any one of the previously described methods when being loaded into a digital processing unit of a computer which computer program elements can also show distributed properties.

In a preferred embodiment, the apparatus forms a unity with a DHCP server, such that DHCP functions as well as mobile device detecting functions are running on the same server hardware which is advantageous as the DHCP functionality might be a valuable source for providing location related information. The apparatus according to the invention might also be integrated into a router.

In case the apparatus further needs information from other network entities in order to determine location information, there are preferably provided respective interfaces, such as an interface to an IP address allocation server, an interface to a router, or an interface to devices themselves for asking the devices for location related information.

The invention embodied in its aspect of a computer program element can preferably provide additional code means for detecting and/or administrating computing inventory. Implementing this aspect of the invention into an inventory detection software enriches conventional inventory detection software by the additional mobile device detection function.

Advantages of the apparatus, the computer program elements and their embodiments go along with the advantages of the inventive method and its embodiments as described above.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings wherein.

Different figures may contain identical references, representing elements with similar or uniform content.

DETAILED DESCRIPTION OF THE DRAWINGS

Figure 1:
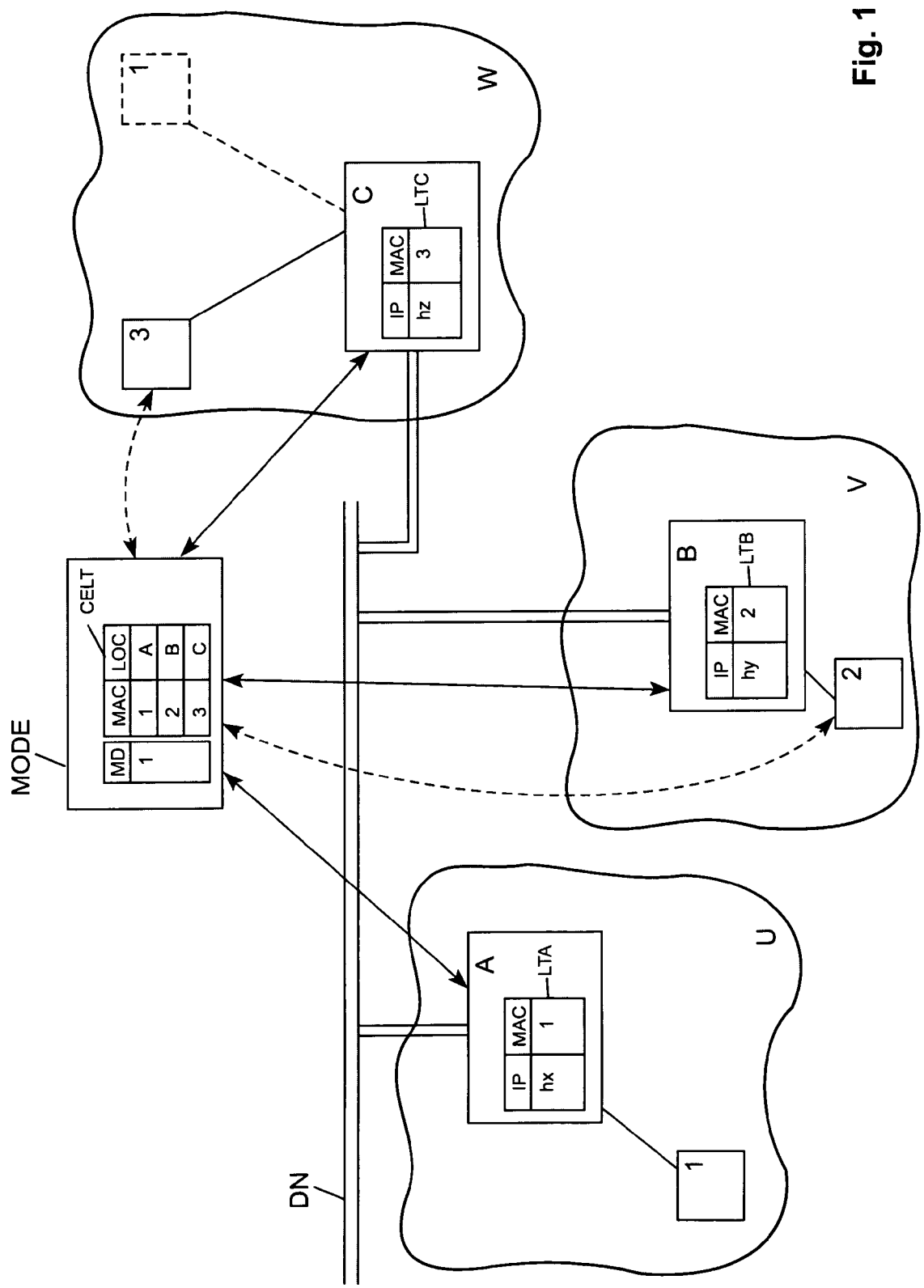
FIG. 1 a diagram of a system comprising an apparatus according to the present invention.

FIG. 1 illustrates a diagram of a system comprising an apparatus according to the present invention. DHCP servers A, B and C represent the first points of contact for all the devices of, for example, company X when requesting connectivity to a data network DN which represents the corporate Intranet. Every connect request causes the allocation of a dynamic IP address to the requesting device by the respective DHCP servers A, B, and C. In order to connect to an IP network in general, a device needs a numeric identifier, i.e. an IP address. A device can be assigned a fixed IP address or a dynamic IP address. In the latter case the address is assigned automatically and may change over time or after restarting the device. A well-known protocol to request a dynamic IP address is DHCP (Dynamic Host Configuration Protocol). Dynamic IP addresses are a flexible way of assigning IP addresses to devices that often change locations within a building of a company or organization.

It is assumed, that each one of the DHCP servers A, B and C is responsible for one of three sites U, V, W the company X maintains. As can be derived from FIG. 1, site U is served by DHCP server A, site V by DHCP server B and site W by DHCP server C. DHCP servers A, B, and C provide access to the data network DN which is schematically represented by a backbone.

Currently, only three devices within company X are linked to the data network DN. Device 1 is located at site U and is connected via DHCP server A, device 2 is located at site V and is connected via DHCP server B, and device 3 is located at site W and connected via DHCP server C.

Every DHCP server maintains a look-up table in which the MAC addresses of devices are mapped to IP addresses allocated these devices by the DHCP server upon request. These look-up tables are referenced as LTA, LTB and LTC for the respective DHCP servers A, B and C.

Reference MDDE represents a mobile device detection engine for classifying a data network connectable computing device as a mobile computing device. The mobile device detection engine MDDE operates within the administrative domain of company X, which means that the task assigned to the mobile device detection engine MDDE is to detect devices that connect to the company wide data network as mobile devices. The detection result might later be used for creating an automatically established inventory.

Therefore, the mobile device detection engine MDDE is a separate server according to FIG. 1 which provides a classification entity look-up table CELT. In the classification entity look-up table CELT, location information LOC is mapped to device identifiers which device identifiers are represented by MAC addresses.

The location information LOC is represented by the various DHCP server IDs: As every DHCP server serves for a different site of company X, each DHCP server represents a defined geographical area (i.e., the area/sites U, V or W) for which it is responsible. The DHCP server ID is used as location information in the classification entity CE. The actual classification entity look-up table CELT illustrates that device 1 is located in the domain of DHCP server A, that device 2 is located in the domain of DHCP server B, and that device 3 is located in the domain of DHCP server C. The classification entity look-up table CELT receives this information by communicating with the DHCP servers A, B and C. This communication is indicated by straight line arrows. Any update of the classification entity look-up table CELT might be performed in different ways. Each DHCP server might automatically notify the classification entity CE upon every new connect request it receives, and therewith transmit the device identifyer. However, when applying this notification scheme, the DHCP servers would have to be adapted with such a communication protocol.

Whenever the DHCP servers should not be adapted, it is preferred to make the mobile device detection engine MDDE request the DHCP server for the relevant data which comprise at least a list of registered device identifiers. As the classification entity knows which DHCP server delivers which list of device identifiers, and provided that the DHCP server as such serves as sufficient location information, the mobile device detection engine MDDE updates its classification entity look-up table CELT.

The classification engine can thereby access lookup-tables LTA, LTB or LTC of DHCP servers which look-up LTA, LTB or LTC tables only show the actual connected devices. However, the history of connected devices which were allocated an IP address can also be stored. Provided a log file is available at a DHCP server, the mobile device detection engine MDDE can access this log file in an alternative embodiment (e.g., on a daily or weekly basis) and can update its own classification entity look-up table CELT, and therefore detect devices with mobile properties each time after having accessed the log files of all the assigned DHCP servers.

Upon notification, upon access to the look-up tables, or upon access to log files, the mobile device detection engine MDDE updates the classification entity look-up table CELT and adds a new entry for each device that was not listed yet in the classification entity look-up table CELT. As the mobile device detection engine MDDE does not know yet whether this device is a mobile one, the register of mobile devices is not yet amended.

In case a device is already listed and assigned to the DHCP server as listed in the classification entity look-up table CELT, the device is probably a stationary device and will not be added to the list of mobile devices.

Assume that device 1 is a mobile device and was moved from the domain of DHCP server A to the domain of DHCP server C, indicated there by dotted lines. Upon the next update process of classification entity look-up table CELT, a comparison routine which compares the location entry of a listed device with the determined location of the connect requesting device will recognize that the actual location (or, in case a log file is the source of information, the last available location) is different from the entry in the classification entity look-up table CELT. Thus, this particular device will be the subject of an entry in a list MD of mobile devices provided at mobile device detection engine MDDE.

However, according to another embodiment, the mobile device detection engine MDDE can also communicate with the devices themselves, indicated by dotted line arrows in FIG. 1. This is preferred when devices are capable to deliver location information themselves.

Summarizing the system as shown in FIG. 1: The mobile device detection engine MDDE maintains a databases of all MAC addresses. Whenever it is detected that a certain MAC address shows up from different locations one knows that it is a mobile device. The location can be determined the way described above. As a nice additional feature, one can also detect new devices that are not supposed to connect to the network at all. The DHCP server either sends the MAC address or records it itself. This is preferred to detect devices that show up only for a very short period. But in order to do anything on the network they need to obtain an IP address and therefore they first contact the DHCP server.

Figure 2:
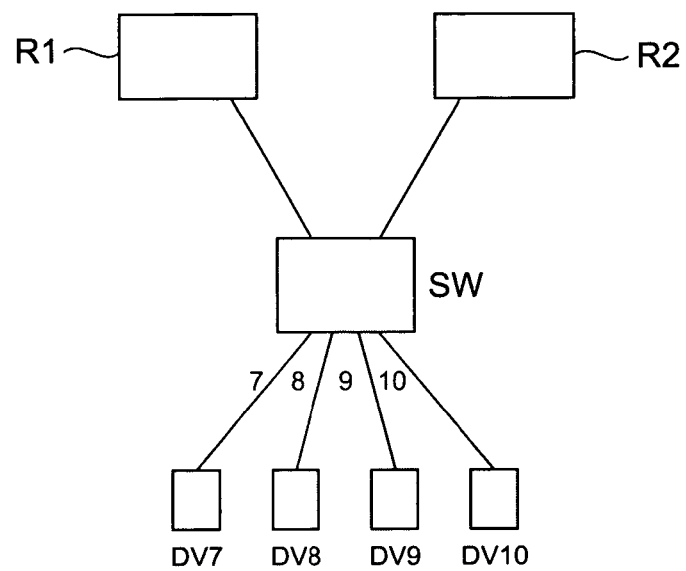
FIG. 2 a schematic diagram of a part of a data network illustrating a particular way of determining the location of a device.

Instead of having DHCP servers represent location information, also routers could be used, provided the classification entity can communicate to the routers in question. According to FIG. 2, a section of a typical network topology is shown: Devices DV7, DV8, DV9 and DV10 are connected at ports 7, 8, 9, 10 of a switch SW. The switch is connected to routers R1 and R2. The switch SW comprises a logic that forwards all messages from ports 7 and 8 to router R1, whereas all messages coming from ports 9 and 10 are forwarded to router R2. Accessing new information provided by routers R1 and R2, it can be detected whether device DV7 is connected to one of the ports 7 and 8, or whether it is connected to ports 9 or 10. Accordingly, packets coming from device DV7 would either end up at router R1 or at router R2. Thus, by monitoring routers R1 and routers R2, a location change of a device might be detected, as the data packets of the same device might end up at different routers subject to the port they are connected to and thus the location they are connected at as different ports of a switch might serve different plugs at different locations. Location information can, furthermore, be provided by DHCP relay agents on routers or by the client themselves.

The invention has been described with reference to specific embodiments and components for purposes of illustration and explanation and is not intended to be an exhaustive description. Modifications will be apparent to those of ordinary skill in the art and should be understood to be within the spirit and scope of the appended claims.

The invention claimed is:

1. A computer-implemented method for automatic detection of a data network connectable mobile computing device by a mobile device detection engine executable by a processor at a fixed data network location comprising the steps of:
   in response to receipt of a registration request, automatically determining location information related to a current physical location of a registering device;
   comparing the determined location information to a stored location information associated with the device;
   detecting the device as a mobile device if at least the stored location information is different from the determined location information;
   ascertaining a device identifier of the registering device;

determining if said device identifier was previously registered at a look-up table in which table location information is stored and associated to device identifiers; and registering the device in the look-up table together with the determined location information if the look-up table does not comprise the device identifier yet.

2. The method according to claim 1 wherein the registration request is a request for allocating a dynamic IP address.

3. The method according to claim 1 wherein the device identifier is the device's machine access code address.

4. The method according to claim 1 wherein the determined location information replaces the stored location information if the device identifier was already registered in the look-up table.

5. The method according to claim 1 wherein any stored location information was stored during previous registration requests of corresponding devices.

6. The method according to claim 1 wherein a domain of an IP address allocation server to which a device's request is sent comprises a location information for the registering device.

7. The method according to claim 1 wherein a domain of a router to which a device's request is sent represents a location information that is assigned to the registering device.

8. The method according to claim 1 wherein an IP address allocation server is accessed for determining the location information.

9. The method according to claim 1 wherein a router is accessed for determining the location information.

10. The method according to claim 1 wherein the determined location information is provided by the device itself upon request.

11. The method according to claim 1 wherein the location information is derived from analyzing a device's signal on a wireless LAN.

12. The method according to claim 1 wherein said detecting comprises detecting the device as a mobile device when the stored location information associated to this device differs from the determined location information for a predefined number of previous comparisons.

13. The method according to claim 1 wherein said detecting comprises detecting the device as a mobile device if the stored location information associated to this device differs from the derived location information for a predefined number of previous comparisons within a given time frame.

14. Apparatus for detecting a data network connectable mobile computing device, comprising a control unit comprising a mobile device detection engine at a fixed data network location, said control unit comprising:

location determining means for, in response to receipt of a registration request, automatically determining location information related to a current physical location of a registering device;

comparison means for comparing the determined location information to a stored location information associated with the device; and identifying means for detecting the device as a mobile device if at least the stored location information is different from the determined location information, wherein said identifying means further ascertains a device identifier of the registering device, determines if said device identifier was previously registered at a look-up table in which table location information is stored and associated to device identifiers, and registers the device in the look-up table together with the determined location information if the look-up table does not comprise the device identifier yet.

15. The apparatus according to claim 14 wherein said apparatus further comprises means for implementing the functions of an IP address allocation server.

16. The apparatus according to claim 14 wherein said apparatus further comprises an interface to an IP address allocation server.

17. The apparatus according to claim 14 further comprising an interface to a router.

18. The apparatus according to claim 14 further comprising an interface to a registering device for asking the device for its location related information.

19. Computer program element comprising computer program code stored at a non-transitory computer readable storage medium and comprising a mobile device detection engine executable by a processor at a fixed data network location for executing a method, when loaded into a digital processing unit of a computer, for automatic detection of a data network connectable mobile computing device, said method comprising the steps of:

in response to receipt of a registration request, automatically determining location information related to a current physical location of a registering device;

comparing the determined location information to a stored location information associated with the device;

detecting the device as a mobile device if at least the stored location information is different from the determined location information;

ascertaining a device identifier of the registering device;

determining if said device identifier was previously registered at a look-up table in which table location information is stored and associated to device identifiers; and registering the device in the look-up table together with the determined location information if the look-up table does not comprise the device identifier yet.

20. The computer program element according to claim 19 wherein said method further comprises detecting and administrating computing inventory.

* * * * *